United States Patent

Fang

[15] 3,701,023

[45] Oct. 24, 1972

[54] PHASE JITTER EXTRACTION METHOD FOR DATA TRANSMISSION SYSTEMS

[72] Inventor: Yang Fang, Clarksburg, Md.

[73] Assignee: International Business Machines Corporation, Armonk, N.Y.

[22] Filed: June 29, 1971

[21] Appl. No.: 157,908

[52] U.S. Cl.....................................325/329, 325/476

[51] Int. Cl...........H04b 1/10, H04b 1/16, H04b 1/68

[58] Field of Search..........325/329, 476; 178/6.6 TC; 179/100.2 S; 340/174.1 A, 174.1 B

[56] References Cited

UNITED STATES PATENTS 3,577,082 5/1971 Lautier......................325/416

OTHER PUBLICATIONS

Allen B. Chertok, A Multiple Speed Partial Response Modem Featuring A Unique SSB Modulation–Demodulation System. IEEE Communication Conference Proceeding 69– CP– 366– COM pages 29– 21 to 29– 29.

*Primary Examiner*—Howard W. Britton
*Attorney*—Karl O. Hesse et al.

[57] ABSTRACT

A carrier recovery method and apparatus for generating a carrier having the proper frequency, relative phase and phase jitter to accurately demodulate a modulated signal having phase jitter. The phase jitter is detected with minimal distortion and modulated onto a carrier signal generated by means of phase locked oscillators.

7 Claims, 3 Drawing Figures

LINE SPECTRUM OF A MULTI-LEVEL VSB SIGNAL AND PILOT SIGNALS FOR $f_1<f_2<f_c-f_a$

LINE SPECTRUM OF A MULTI-LEVEL VSB SIGNAL AND PILOT SIGNALS FOR $f_1>f_c+f_o+f_b$ AND $f_2<f_c-f_a$

*INVENTOR.*
YANG FANG

*BY* Karl O. Hesse
*AGENT*

PHASE JITTER EXTRACTION METHOD FOR DATA TRANSMISSION SYSTEMS

FIELD OF THE INVENTION

This invention relates to modulated carrier wave communication systems in general and to suppressed carrier wave systems in particular.

FIELD OF THE INVENTION

It is well-known that accurate demodulation of a modulated information signal requires a local carrier of precisely controlled frequency and phase relative to the information signal. During transmission, the information signal is often subjected to numerous impairments including frequency translation. The static component of frequency translation is often called frequency offset and the dynamic portion of frequency translation is often referred to as phase jitter.

A classic method of dealing with frequency translation in single sideband systems is to transmit a pilot signal at the carrier frequency which is separated from the data spectrum by a narrow band-pass filter. The carrier recovered from this pilot has the desired frequency offset. Because of the proximity of the carrier frequency to the modulated signal spectrum, it is difficult to provide adequate bandwidth to permit tracking of the phase jitter because a narrow band-pass filter must be used to separate the pilot from the data spectrum. This classic method will not work at all for vestigial sideband systems because in such systems the data spectrum overlaps the carrier frequency.

Since the dynamic phase disturbances characterized as phase jitter induce equal and synchronous phase deviations into all spectrum components transmitted through the communications medium, they may be communicated to the receiver by any convenient frequency within the transmission band. The most commonly proposed solution to the phase jitter problem is to design the pilot isolation filter or phase locked oscillator to have adequate bandwidth to allow the recovered pilot signal to faithfully reproduce the phase modulation impressed upon the transmitted pilot signal and thereby recover the phase jitter. This second method is based on the assumption that negligible phase shift will be introduce into the phase jitter components below 120 Hz of the recovered pilot. In practice, large phase shifts are introduced into the phase jitter components by the phase locked oscillator and by the pilot isolation filter as the carrier is being recovered. The phase shift introduced into the phase jitter components by the pilot recovery circuits distorts the desired phase jitter information and in some instances, it can cause the effective phase jitter at the demodulator to exceed the original phase jitter introduced by the transmission medium. This problem is clearly shown in Table I.

SUMMARY OF THE INVENTION

It is an object of this invention to generate an improved demodulation carrier having the proper frequency and phase to accurately demodulate a modulated signal having frequency offset and phase jitter.

It is a further object of this invention to generate an improved demodulation carrier which will demodulate any modulated signal having phase jitter, including vestigial sideband signals as well as single sideband signals.

It is a still further object of this invention to generate a demodulation carrier signal which faithfully tracks phase jitter introduced by the transmission medium with negligible phase shift and which is not sensitive to interference introduced by the modulated signal spectrum components.

These and other objects of my invention will become clear when reading the remainder of this specification.

I accomplish the above objects of my invention by generating a carrier signal which includes the frequency offset introduced by the transmission medium but does not yet include the phase jitter also introduced by the transmission medium. I recover the phase jitter component of the frequency translation introduced by the transmission medium by means of a phase comparator and a low-pass filter having a cut-off frequency much greater than the jitter frequency so that negligible phase shift is introduced into the phase jitter. I then modulate the generated carrier signal with the phase jitter signal by means of a phase modulator, in order to create a demodulation carrier signal which will accurately demodulate any modulated information signal having phase jitter.

THEORY OF OPERATION

Figure 1:
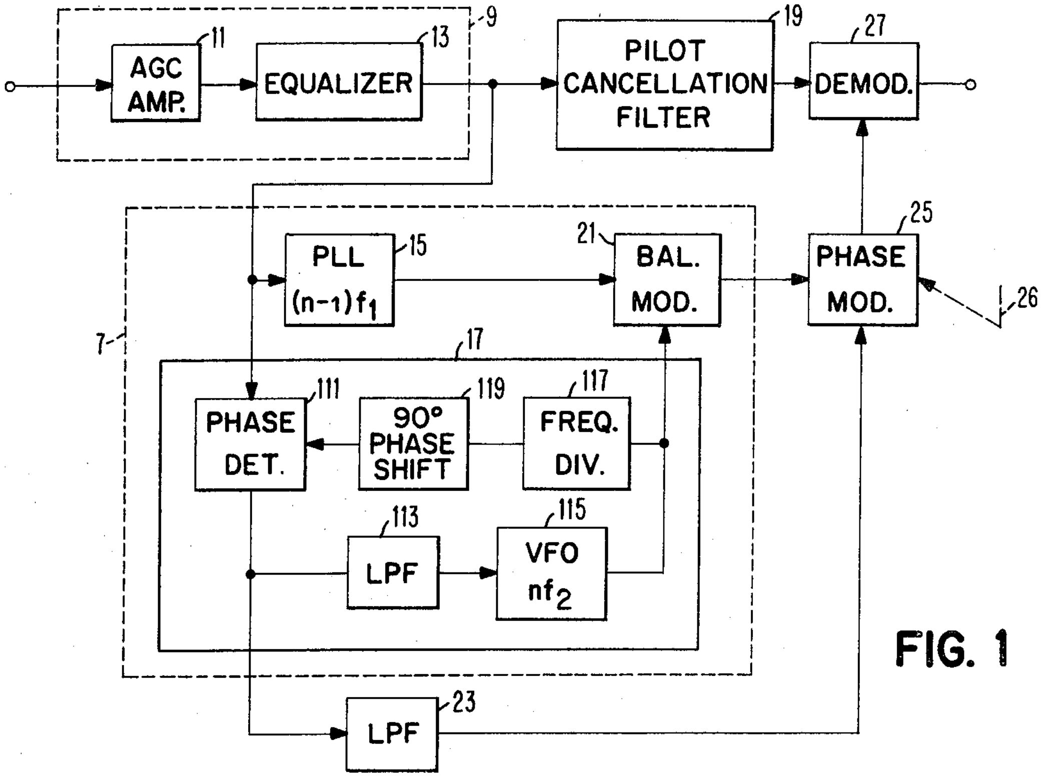
FIG. 1 shows a block diagram of my invention as used to recover a demodulation carrier for a vestigial sideband signal.

Before delving into a detailed description of the embodiment of my invention, a short theoretical discussion will be set out to show the effect of the phase jitter impairment of the transmission media on modulated signals and the effect of the phase shift introduced into the phase jitter components by the carrier recovery circuits. This discussion will lay the ground work for a better understanding of the essence of my invention, and how it operates.

The phase jitter in a transmission channel is usually considered as an incidential low-index frequency modulation of the signal components. The peak-to-peak phase jitter is about 15° and the spectrum of the phase jitter consists of sideband components from about 40 to 200 Hz.

Mathematically, the phase jitter effect on a single frequency component can be expressed as $\cos[\omega t+\theta(t)+\psi$ where $\psi$ is a fixed phase angle and $\theta(t)$ is the phase jitter which is a function of time.

Considering by way of example, the VSB (vestigial sideband) signal of a baseband information signal $g(t)$ $$v(t)=g(t)\cos\omega_c t-h'(t)\sin\omega_c t \quad 1$$

where $\omega_c$ is the angular carrier frequency and $h'(t)$ is a Modified Hilbert transform as described in copending application Ser. No. 145,685 filed May 21, 1971 which will produce the desired VSB signal.

If the VSB signal $v(t)$ passes through a transmission channel with phase jitter $\theta(t)$, the output of the channel will be $$v'(t)=g(t)\cos[\omega_c t+\theta(t)]-h'(t)\sin[\omega_c t+\theta(t)]. \quad 2$$

To recover the baseband signal $g(t)$ without distortion from $v'(t)$, the demodulation carrier must be exactly equal to $\cos[\omega_c t+\theta(t)]$. Theoretically, such a carrier can be generated. Practically, however, this is a difficult task, since every carrier recovery technique will introduce some unwanted phase shift on the phase jitter sideband components of the carrier, and this unwanted phase shift will introduce distortion in $g(t)$. This point can easily be seen in the following analysis.

To simplify the analysis, let us assume that $$\theta(t)=k\cos\omega_p t \quad 3$$

where $\omega_p=2\pi f_p$ and $f_p$=120 Hz as a typical value, and the coefficient $k=0.131$ is so chosen that the peak-to-peak value of $\theta(t)$ is equal to 0.262 radian (approximately 15°) [For an actual channels, $\theta(t)$ consists of many frequency components. The overall peak-to-peak phase jitter is still 15°. Therefore, the coefficient $k$ for each frequency component will be much smaller than 0.131.] Thus, $$\cos[\omega_c t+\theta(t)]\approx J_0(k)\cos\omega_c t-J_1(k)[\sin(\omega_c-\omega_p)t+\sin(\omega_c+\omega_p)t] \quad 4$$

and $$\sin[\omega_c t+\theta(t)]\approx J_0(k)\sin\omega_c t+J_1(k)[\cos(\omega_c-\omega_p)t+\cos(\omega_c+\omega_p)t] \quad 5$$

In Equations (4) and (5), the terms with coefficients of higher order Bessel functions have been neglected since for $k=0.131$, $J_2(k)$=0.00214 as compared with $J_0(k$a90.9957 and $J_1(k)$=0.0652.

The VSB signal $v'(t)$ in Equation (2) then becomes $$v'(t)=g(t)\{J_0(k)\cos\omega_c t-J_1(k)[\sin(\omega_c-\omega_p)t+\sin(\omega_c+\omega_p)t]\}-h'(t)\{J_0(k)\sin\omega_c t+J_1(k)[\cos(\omega_c-\omega_p)t+\cos(\omega_c+\omega_p)t]\} \quad 6$$

Equation (6) describes the VSB signal at the output of a transmission channel with phase jitter $\theta(t)$ as shown in Equation (3).

At this point, let us assume an ideal carrier circuit which recovers the carrier with phase jitter sideband components as shown in Equation (4). The demodulated signal obtained after demodulation is $$D(t)=v'(t)\{J_0(k)\cos\omega_c t-J_1(k)[\sin(\omega_c-\omega_p)t+\sin(\omega_c+\omega_p)t\} \quad 7$$

and the baseband information signal obtained after filtering is $$g'(t)=g(t)[\tfrac{1}{2}J_0^2(k)+J_1^2(k)+J_1^2(k)\cos 2\omega_p t] \quad 8$$

From Equation (8), the interference introduced by the term $J_1^2(k)\cdot\cos 2\omega_p t$ to the baseband signal $g(t)$ is $2J_1^2(k)/[J^2(k)+2J_1^2(k)]$. For $k$=0.131, it corresponds to −41.4 dB. This is below the noise level in an ordinary transmission channel and can be ignored.

Now, let us examine the effect of the phase jitter if the demodulation carrier is $\cos\omega_c t$. In such a case, the demodulated signal is $$D'(t)=v'(t)\cos\omega_c t=\tfrac{1}{2}J_0(k)\{g(t)-[2J_1(k)/J_0(k)]h'(t)\cos\omega_p t\} \quad 9$$

+ high frequency components and the baseband signal obtained after filtering is $$g''(t)=\tfrac{1}{2}J_0(k)\{g(t)-[2J_1(k)/J_0(k)]h'(t)\cos\omega_p t\} \quad 10$$

The last term in Equation (10) can be considered as an equivalent noise introduced by the phase jitter. This equivalent noise power can be calculated as follows.

Assume that at sampling instants $mT$ ($m$ is an integer), $h'(mT)$ is normalized to +1 and −1. The average power of the random data $g(g)$ is 1. The signal $h'(t)$ is the Modified Hilbert transform corresponding to a logical "1" (+1) in $g(t)$ and the signal $-h'(t)$ is the Modified Hilbert transform corresponding to a logical "0" (−1) in $g(t)$. Since the effective power of $\cos\omega_p t$ is ½, the Equivalent Noise Power (E.N.P) at sampling instants can be expressed as $$\text{E.N.P}=\tfrac{1}{2}[2J_1(k)/J_0(k)]^2\sum_m 2[h'(mT)]^2 \quad 11$$

From Equation (11) and the normalized values of $h'(mT$, it can be shown that E.N.P.~0.0132=−18.8 db referenced to 0 db baseband signal power for any multilevel VSB system. This equivalent noise power introduced by the phase jitter will prevent satisfactory operations of a high speed (more than 2.5 bits/Hz ) VSB data transmission system.

From the above discussion, it can be seen that it is imperative to have a carrier recovery system that extracts the phase jitter information faithfully so that the phase jitter effect can be reduced as much as possible. Unfortunately, any practical carrier recover circuit will introduce some unwanted phase shift to the phase jitter sideband components, and this unwanted phase shift will decrease the effectiveness of any phase jitter extraction method and sometimes it even aggrevate the situation. The effect of unwanted phase shift will be shown in the following discussion.

Since the phase jitter has a narrow bandwidth, it is reasonable to assume that the phase shift introduced into the phase jitter components is linear. Thus, the carrier obtained from a practical carrier recovery circuit can be expressed as $$\cos[\omega_c t+\theta'(t)]\approx J_0(k)\cos\omega_c t-J_1(k)[\sin(\omega_c t-\omega_p t+\phi)+\sin(\omega t+\omega_p t-\phi)] \quad 12$$

where $\phi$ is the linear phase shift introduced to the sideband components. When the VSB signal $v'(t)$ is demodulated by this carrier the demodulated signal obtained is $$D''(t)=v'(t)\cos[\omega_c t+\theta'(t)]$$
$$=g(t)[\tfrac{1}{2}J_0^2(k)+J_1^2(k)\cos\phi+J_1^2(k)\cos(2\omega_p t-\phi)]-h'(t)J_0(k)J_1(k)[\cos\omega_p t-\cos(\omega_p t-\phi)] \quad 13$$

+high frequency components. After low-pass filtering the demodulated signal, the baseband signal obtained is $$g'''(t)=g(t)[\tfrac{1}{2}J_0^2(k)+J_1^2(k)\cos\phi+J_1^2(k)\cos(2\omega_p t-\phi)]-h'(t)J_0(k)J_1(k)\sqrt{(1-\cos\phi)^2+\sin^2\phi}\cos(\omega_p t-\beta) \quad 14$$

where $$\beta=\tan^{-1}\sin\phi/(1-\cos\phi) \quad 15$$

For $k=0.131$, the baseband signal $g'''(t)$ in Equation (14) can be approximated as $$g'''(t)=\tfrac{1}{2}[g(t)-0.13\sqrt{(1-\cos\phi)^2+\sin^2\phi}\,h'(t)\cos(\omega_p t-\beta)] \quad (16)$$

From Equation (16), we can find the resulted equivalent phase jitter due to the phase jitter extraction as a function of $\phi$:

$$k'=0.13\sqrt{(1-\cos\phi)^2+\sin^2\phi} \quad 17$$

The relationship in Equation (17) is tabulated in Table I.

TABLE I

Relationships Between $\phi$ and the Equivalent Phase Jitter

| $\phi$ | Original Phase Jitter $k$ | Peak-to-Peak Degree | Equivalent Phase Jitter $k'$ | Peak-to-Peak Degree |
|---|---|---|---|---|
| 0° | 0.131 | 15° | 0.0000 | 0.00° |
| 5° | 0.131 | 15° | 0.0113 | 1.30° |
| 10° | 0.131 | 15° | 0.0226 | 2.59° |
| 15° | 0.131 | 15° | 0.0340 | 3.90° |
| 20° | 0.131 | 15° | 0.0451 | 5.17° |
| 30° | 0.131 | 15° | 0.0673 | 7.71° |
| 45° | 0.131 | 15° | 0.0665 | 11.4° |
| 60° | 0.131 | 15° | 0.1300 | 14.9° |
| 90° | 0.131 | 15° | 0.1840 | 21.1° |
| 180° | 0.131 | 15° | 0.26 | 29.8° |

The improvement obtained by recovering the phase jitter sideband components for small $\phi$ (less than 20°) is obvious from Table I. If $\phi$ is greater than 60°, recovering the phase jitter sideband component will result in an equivalent phase jitter (peak-to-peak) which is greater than the original phase jitter. Thus, in implementing a carrier recovery system which extracts the phase jitter information, extreme care must be taken such that the linear phase shift $\phi$ introduced to the phase jitter sideband components is kept as small as possible. It is not possible to keep $\phi$ small when using phase locked oscillators for carrier recovery of the prior art.

Although the foregoing analysis has been developed by way of a particular modulated signal (VSB signal) it will apply equally well to other modulated signals such as single sideband signals.

Figure 2:
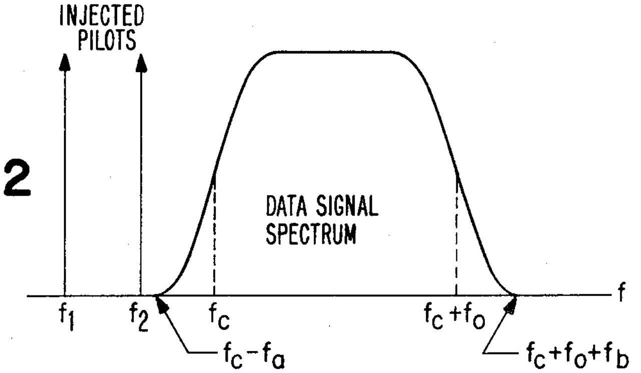
FIG. 2 shows the line spectrum of a multilevel VSB signal and pilot signals for $f_1<f_2<f_c-f_a$.
Figure 3:
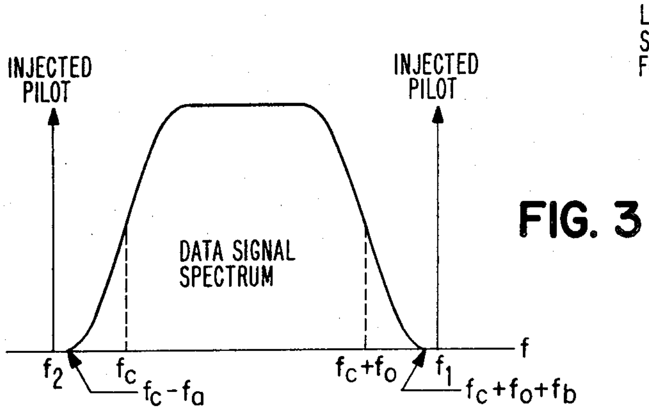
FIG. 3 shows the line spectrum of a multilevel VSB signal and pilot signals for $f_1>f_c+f_o+f_b$ and $f_2<f_c-f_a$.

DESCRIPTION OF A PREFERRED EMBODIMENT:

In order to make the preferred embodiment of my invention more clear, it is shown and described as part of a VSB system which is particularly useful for transmitting digital data. The VSB signal occupies the bandwidth from $f_c-f_a$ to $f_c+f_o+f_b$ where $f_c$ is the carrier frequency, $f_a$ is the vestigial bandwidth, $f_o$ is the Nyguist bandwidth of the symbol rate and $f_b$ is the data shaping bandwidth. In order to recover the frequency offset introduced by the transmission medium, two pilot signals are added to the VSB signal at the transmitter. The first pilot signal $f_1$ and the second pilot signal $f_2$ are used by carrier recovery circuit 7 to generate third and fourth pilot signals $f_3$ and $f_4$ respectively. The third and fourth pilot signals can appear as either a higher harmonic or a subharmonic of the first and second pilot signals respectively, and as used in this specification, the word harmonic means either higher or subharmonics. The relationship between the pilot signals $f_1$, $f_2$, $f_3$, $f_4$, and the carrier signal $f_c$ is shown by the following Equations (18) and (19).

$$\left.\begin{array}{l} f_4=nf_2 \\ f_3=(n-1)f_1 \\ f_o=f_4-f_3 \end{array}\right\} \text{ for } f_1<f_2<f_o-f_a \qquad (18)$$

or $$\left.\begin{array}{l} f_4=\left(1-\frac{1}{n}\right)f_2 \\ f_3=\frac{1}{n}f_1 \\ f_o=f_4+f_3 \end{array}\right\} \text{ for } \begin{array}{l} f_1>f_o+f_o+f_b \\ f_2<f_o-f_a \end{array} \qquad (19)$$

where $n$ is an integer. The relative positions of the pilot signals $f_1$ and $f_2$ in Equation (18) with respect to the VSB signal spectrum are shown in FIG. 2 and the relative positions of the pilot signals $f_1$ and $f_2$ in Equation (19) with respect to the VSB signal spectrum are shown in FIG. 3. In either case, the frequency gap $f_c-f_a-f_2$ should be much greater than the phase jitter frequency $f_p$ so that the data components can be easily filtered out during the phase jitter information extraction without introducing large phase shift to the phase jitter components.

In the preferred embodiment of my invention, I choose the relationship of Equation (18). Thus, the frequencies $f_1$, $f_2$ and $f_c$ are related by the following Equation (20).

$$nf_2-(n-1)f_1=f_c \qquad 20$$

Referring now to FIG. 1, a detailed description of the preferred embodiment of my invention will be set out.

An input circuit 9 is provided in order to receive the modulated information signal and its associated first and second pilot signals from the transmission medium. Input circuit 9 includes an amplifier 11 having automatic gain control which provides an output signal of constant amplitude regardless of variations in the attenuation characteristics of the transmission medium. Input circuit 9 also includes an equalizer 13 to equalize the envelope delays of the transmission channel to provide a less than 250 microsecond difference between the envelope delay at $f_2$ and the envelope delay at the midband of the VSB signal. This equalizer will greatly reduce the phase shift introduced to the phase jitter components by the differential envelope delay between $f_2$ and the midband of the VSB signal.

After being amplified and equalized in input circuit 9, the two pilot signals and the modulated information signal are applied to pilot cancellation filter 19, and to carrier recovery circuit 7. Carrier recovery circuit 7 includes phase locked oscillators 15 and 17 as well as balanced modulator 21.

In order to recover the first pilot signal, a phase locked oscillator 15 is provided. Phase locked oscillator 15 contains a phase detector, a narrow band low-pass filter and a variable frequency oscillator having a nominal frequency at $(n-1)f_1$ which are all well-known in the art and therefore not shown in the drawing.

A second phase locked oscillator 17 is provided for generating an output signal having a frequency of n times the second pilot frequency which has been chosen at $f_2$ for the purposes of this embodiment. Phase locked oscillator 17 includes a phase detector 111, a low-pass filter 113 and a variable frequency oscillator 115. The variable frequency oscillator 115 has a nominal operating frequency of $nf_2$. Low-pass filter 113 is a narrow band first order filter which gives the entire phase locked oscillator loop an unconditionally stable second order characteristic. The output of variable frequency oscillator 115 is connected to a frequency divider 117 such as a flip flop. The output of frequency divider 117 will be equal to the frequency of the second pilot signal $f_2$. The output of frequency divider 117 is connected to the input of 90°phase shifter 119. The output of phase shifter 119 is connected to the second input of phase detector 111. Inasmuch as the operation of phase locked oscillators are well-known in the art, it is believed that a detailed description of phase locked oscillators 15 and 17 is unnecessary.

Balanced moculator 21 which includes a band-pass filter for passing only the lower sideband of the modulation product generates a carrier with nominal frequency $f_c$ and frequency offset $\alpha$ but no phase jitter according to the following equation.

$$f_c+\alpha=n(f_2+\alpha)-(n-1)(f_1+\alpha) \qquad 21$$

The first term of the right side of Equation (21) is provided at the output of phase locked oscillator 17 which is connected to a first input of balanced modulator 21. The second term on the right side of Equation (21) is provided by the output of phase locked oscillator 15 which is connected to a second input of balanced modulator 21. $\alpha$ represents the static frequency offset component of the frequency translation introduced into all spectrum components transmitted through the communication medium, including the VSB signal. The output of carrier recovery circuit 7 appears at the output of balanced modulator 21.

To add the proper phase jitter to the recovered carrier, the output of phase detector 111 which is actually the phase jitter baseband signal plus some high frequency components is utilized. The high frequency components are filtered out by low-pass filter 23 which has a cut-off frequency at $f_c-f_a-f_2$ which is much greater than the frequency $f_p$ of the phase jitter signal. Low-pass filter 23 provides the phase jitter baseband signal at its output which is connected to one input of phase modulator 25. Phase modulator 25 adds the phase jitter signal to the recovered carrier signal to provide a demodulation carrier signal having a phase jitter which is substantially identical to the phase jitter of the VSB signal.

Phase modulator 25 also has an automatic or manual input 26 for providing a fixed phase adjustment to compensate for fixed phase delays introduced into the generated carrier signal by the phase locked oscillator and balanced modulator circuits. Phase modulators and manual linear phase adjustment circuits are well-known in the art and for this reason, they are not disclosed in detail in FIG. 1.

Pilot cancellation filter 19 removes the pilot signals from the information signal. The output of pilot cancellation filter 19 is connected to a first input of demodulator 27. The output of phase modulator 25 is connected to the second input of demodulator 27 in order to provide the demodulation carrier signal necessary to demodulate the information signal

OPERATION

Referring again to FIG. 1, the operation of my invention while generating an improved carrier signal for demodulation of a VSB modulated information signal having frequency offset and phase jitter will be described. The VSB information signal and its associated first and second pilot signals are applied to input circuit 9 at the input of automatic gain controlled amplifier 11. Amplifier 11 amplifies the input signals to a constant amplitude and equalizer 13 equalizes the envelope delays of the transmission channel to provide a delay difference of less than 250 microseconds between the envelope delay at $f_2$ and the envelope delay at the midband of the VSB signal.

After being amplified and equalized, the two pilot signals received through the transmission medium are used by carrier recovery circuit 7 to generate a carrier signal having a frequency equal to the required demodulation carrier signal, which includes the frequency offset introduced by the transmission medium. Phase locked oscillator 15 is used to generate a third pilot signal having a frequency which is an (n-1) th harmonic of the frequency $f_1$ of the first received pilot signal. Phase locked oscillator 17 generates a fourth pilot signal having a frequency which is an $n^{th}$ harmonic of the frequency $f_2$ of the second received pilot signal.

The third pilot signal is then modulated onto the fourth pilot signal in balanced modulator 21, to generate a modulation product comprising two sidebands. Balanced modulator 21 also contains a band-pass filter which selects the sideband having a frequency of the demodulation carrier, and provides that sideband at the output of carrier recovery circuit 7.

I recover the phase jitter signal plus some high frequency components at the output of phase detector 111 before it passes through narrow band low-pass filter 113, by comparing the second pilot signal with a comparison harmonic of the fourth pilot signal. The comparison harmonic of the fourth pilot signal has a frequency equal to the frequency of the second pilot signal but is in quadrature phase relationship with the second pilot signal. The comparison harmonic is generated from the fourth pilot signal by passing the fourth pilot signal through frequency divider 117 and 90° phase shifter 119. If one wishes to use my method in accordance with Equation 19, where the third and fourth pilots are subharmonics, instead of equation 18 as described thus far, a frequency multiplier must be substituted for the frequency divider 117. It would, of course, be well within the skill of the art to use a separate phase detector to recover the phase jitter signal. The high frequency components are filtered out by low-pass filter 23 which has a cut-off frequency at $f_c-f_a-f_2$ which is much greater than frequency $f_p$ of the phase jitter signal and therefore introduces very small phase shift into the phase jitter components.

The phase shift introduced into the phase jitter components is kept to a small value by using equalizer 13 in the input circuit 9, by choosing a second pilot signal frequency $f_2$ at a frequency spaced away from the frequency band of the modulated VSB signal spectrum, and in addition, by not passing the phase jitter signal through filters having narrow passbands relative to the phase jitter frequency.

After recovering the carrier signal and the phase jitter signal, the recovered carrier signal is phase modulated with the phase jitter signal in phase modulator 25 to create a demodulation carrier which jitters in phase synchronism with the modulated VSB signal.

Although I have described my invention in terms of a particular example including VSB signal demodulation carrier generating method and circuits, it will be recognized by those skilled in the art that the principles of my invention are equally applicable to other modulated information signals such as single sideband signals.

While the invention has been particularly shown and described with reference to the particular embodiment thereof, it will be understood by those skilled in the art that the foregoing and other changes in form and detail may be made therein without departing from the scope of the invention.

What I claim is:

1. A method of generating a demodulation carrier signal for use in demodulating a modulated signal having phase jitter comprising the steps of:

recovering a carrier signal having a frequency of said demodulation carrier signal;

recovering a pilot signal from a received pilot signal having a frequency spaced away from the frequency band of said modulated signal;

comparing said recovered pilot signal with said received pilot signal in a phase detector to detect said phase jitter;

phase modulating said recovered carrier signal with said phase jitter to generate said demodulation carrier signal.

2. The method of claim 1 wherein said third and fourth pilot signals are higher harmonics of said first and second pilot signals respectively.

3. The method of claim 1 wherein said third and fourth pilot signals are subharmonics of said first and second pilot signals respectively.

4. The method of claim 1 wherein said third pilot signal is a first order harmonic of said first pilot signal, and wherein said fourth pilot signal is a second order harmonic of said second pilot signal.

5. A method of generating a demodulation carrier signal for use in demodulating a modulated signal having phase jitter comprising the steps of:

receiving said modulated signal and at least a first and a second pilot signals;

generating a third pilot signal, said third pilot signal having a frequency which is a harmonic of said first pilot signal and is synchronized with said first pilot signal;

generating a fourth pilot signal, said fourth pilot signal having a frequency which is a harmonic of said second pilot signal and is synchronized with said second pilot signal, the order of said harmonic of said second pilot signal differing from the order of said harmonic of said first pilot signal by one;

modulating said third pilot signal onto said fourth pilot signal thereby generating a modulation product;

filtering said modulation product so as to retain only one sideband of said modulation product, said retained sideband having the frequency of said demodulation carrier signal;

comparing, in a phase detector, one of said first and second pilot signals with a comparison harmonic of one of said third and fourth pilot signals respectively, said comparison harmonic having a frequency equal to said one of said first and second pilots signals, to generate an output signal including said phase jitter;

filtering said output signal in a low pass filter to detect said phase jitter;

phase modulating said retained sideband with said phase jitter thereby generating said demodulation carrier signal which jitters in phase synchronism with said modulated signal.

6. A demodulation carrier generation circuit for use in a modulated signal receiver comprising:

carrier recovery circuit means for receiving a plurality of pilot signals and recovering therefrom a carrier signal having a frequency of said demodulation carrier signal;

phase locked oscillator means for receiving a first pilot signal of said plurality of pilot signals and recovering therefrom a recovered pilot signal without phase jitter;

phase detector means having a first input connected to said phase locked oscillator and having a second input for receiving said first pilot signal for comparing the phase of said recovered pilot signal with the phase of said first pilot signal to detect phase jitter of said first pilot signal;

phase modulation means connected to said phase detector and to said carrier recovery circuit for modulating said recovered carrier signal with said detected phase jitter to generate said demodulation carrier.

7. A demodulation carrier generating circuit for use in a modulated signal receiver comprising:

first phase locked oscillator means having an input for receiving a plurality of received pilot signals having phase jitter and recovering therefrom a first recovered pilot signal having a frequency $(n-1)$ times the frequency of a first received pilot signal;

second phase locked oscillator means having an input for receiving said plurality of received pilot signals and generating a signal therefrom having a frequency of $n$ times the frequency of a second received pilot signal;

modulation means connected to said first phase locked oscillator and to said second phase locked oscillator for generating a carrier signal having a frequency of said demodulation carrier;

phase detector means having a first input for receiving said plurality of received pilot signals and having a second input for receiving the quadrature of the $n^{th}$ subharmonic of the output of said second phase locked oscillator, said phase detector providing at its output, a signal comprising said phase jitter;

lowe-pass filter means connected to said output of said phase detector means, said low-pass filter means having a cut-off frequency characteristic significantly greater than the frequency of said phase jitter for passing the phase jitter component of said signal comprising said phase jitter;

phase modulation means connected to said low-pass filter means and to said modulation means for modulating said generated carrier signal with said phase jitter component to provide a carrier signal which jitters in phase synchronism with said modulated signal.

* * * * *

PO-1050
(5/69)

UNITED STATES PATENT OFFICE
CERTIFICATE OF CORRECTION

Patent No. 3,701,023 Dated October 24, 1972

Inventor(s) Yang Fang

It is certified that error appears in the above-identified patent and that said Letters Patent are hereby corrected as shown below:

Column 4, lines 38 and 39, Equation 12 as "$\cos[\omega_c t+\theta'(t)] \cong J_o(k)\cos\omega_c t-J_1(k)[\sin(\omega_c t-\omega_p t+\phi)+\sin(\omega t+\omega_p t-\phi)]$" should read --$\cos[\omega_c t+\theta'(t)]\cong J_o(k)\cos\omega_c t-J_1(k)[\sin(\omega_c t-\omega_p t+\phi)+\sin(\omega_c t+\omega_p t-\phi)]$--

Signed and sealed this 16th day of April 1974.

(SEAL)
Attest:

EDWARD M.FLETCHER,JR.
Attesting Officer

C. MARSHALL DANN
Commissioner of Patents

45